(12) United States Patent
Shimamoto et al.

(10) Patent No.: US 11,584,384 B2
(45) Date of Patent: Feb. 21, 2023

(54) VEHICLE CONTROL SYSTEM

(71) Applicant: HONDA MOTOR CO., LTD., Tokyo (JP)

(72) Inventors: Gaku Shimamoto, Saitama (JP); Junpei Noguchi, Saitama (JP); Naotoshi Takemura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 17/101,078

(22) Filed: Nov. 23, 2020

(65) Prior Publication Data
US 2021/0197843 A1    Jul. 1, 2021

(30) Foreign Application Priority Data

Dec. 26, 2019  (JP) .............................. JP2019-235702

(51) Int. Cl.
*B60W 50/08* (2020.01)
*B60W 30/06* (2006.01)
(Continued)

(52) U.S. Cl.
CPC .......... *B60W 50/082* (2013.01); *B60W 30/06* (2013.01); *B60W 40/105* (2013.01); *G05D 1/0016* (2013.01); *B60W 2554/80* (2020.02); *B60W 2556/45* (2020.02); *G05D 2201/0213* (2013.01)

(58) Field of Classification Search
CPC .. B60W 50/082; B60W 30/06; B60W 40/105; B60W 2556/45; B60W 2554/80; G05D 1/0016; G05D 2201/0213
See application file for complete search history.

(56) References Cited

U.S. PATENT DOCUMENTS

2017/0192428 A1*   7/2017  Vogt ..................... G05D 1/0257
2018/0364737 A1   12/2018  Lavoie et al.
(Continued)

FOREIGN PATENT DOCUMENTS

JP     2019514088 A      5/2019
JP     2019119231 A  *   7/2019
(Continued)

OTHER PUBLICATIONS

Machine translation of JP-2019119231-A (Year: 2019).*
Notice of Reasons for Refusal for Patent Application JP 2019235702 dated Aug. 10, 2021; 10 pp.

*Primary Examiner* — Jeff A Burke
*Assistant Examiner* — Mohamad O El Sayah
(74) *Attorney, Agent, or Firm* — Armstrong Teasdale LLP

(57) ABSTRACT

A vehicle control system includes: a terminal configured to be carried by a user; and a control device configured to execute a remote autonomous moving process to move a vehicle from an initial position to a prescribed stop position based on an input from the terminal and to stop the vehicle at the stop position. The remote autonomous moving process proceeds on condition of continuation of a reciprocating operation on the terminal by the user, and has a plurality of modes in which a vehicle speed to move the vehicle is set to values different from each other. The control device or the terminal is configured to select one of the plurality of modes based on a speed of the reciprocating operation.

6 Claims, 6 Drawing Sheets

(51) Int. Cl.
  *G05D 1/00* (2006.01)
  *B60W 40/105* (2012.01)

(56) References Cited

U.S. PATENT DOCUMENTS

| | | | |
|---|---|---|---|
| 2019/0018404 A1 | 1/2019 | Bourassi et al. | |
| 2019/0204821 A1* | 7/2019 | Yoon | B62D 15/027 |
| 2021/0026347 A1* | 1/2021 | Nakashima | H04B 1/3822 |
| 2021/0291814 A1* | 9/2021 | Shirozono | B60W 50/14 |

FOREIGN PATENT DOCUMENTS

| | | |
|---|---|---|
| JP | 2019119231 A | 7/2019 |
| JP | 2019171889 A | 10/2019 |
| KR | 20150006270 A | 1/2015 |

* cited by examiner

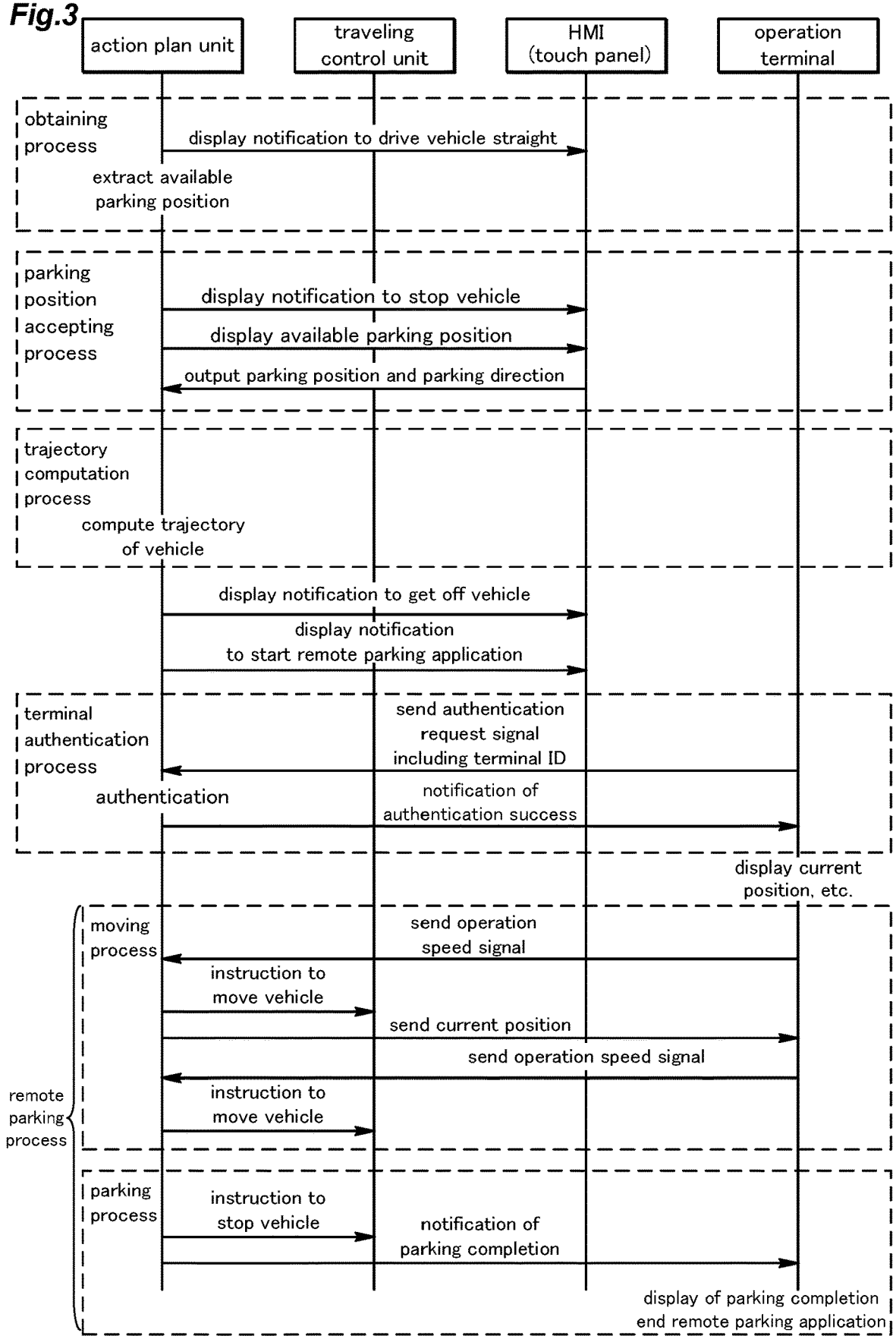

VEHICLE CONTROL SYSTEM

TECHNICAL FIELD

The present invention relates to a vehicle control system configured to execute a remote autonomous moving process of a vehicle by using a terminal carried by a user.

BACKGROUND ART

A known vehicle control system executes a remote autonomous parking process to move a vehicle to a parking position by a remote operation as a user operates an operation terminal carried by the user outside the vehicle. The operation terminal sends a signal indicating an instruction (for example, an instruction to start, to continue, or to stop traveling of the vehicle) inputted by the user to a control device provided in the vehicle. The control device computes a trajectory (traveling route) of the vehicle to the parking position and causes the vehicle to travel along the trajectory in response to the signal received from the operation terminal.

During such a remote autonomous parking process, it is preferable that the user operates the operation terminal and thus confirms that the user himself/herself is a person who actually controls operation of the vehicle by remote autonomous parking. For example, Japanese Unexamined Patent Application Publication (Translation of PCT Application) No. 2019-514088 discloses a method for continuing operation of a vehicle by remote autonomous parking. In this method, a continuous moving operation of a finger, which a user should perform on a touch screen of an operation terminal, is guided by a point-to-point track test. This point-to-point track test displays a double rectilinear arrow, two points, or the like on the touch screen. The double rectilinear arrow forms a display for the tracing to be performed by using the finger. The two points are located on both sides of the double rectilinear arrow so as to indicate the limits of the tracing. The user places a thumb of one hand at a positioning point on the touch screen. At the same time, the user moves a finger of the other hand continuously and linearly on the double rectilinear arrow (namely, the user repeats a reciprocating operation), thereby continuing the operation of the vehicle.

In the remote autonomous parking process disclosed in the above document, the reciprocating operation by the user is used to determine whether to continue or stop the operation of the vehicle by the remote autonomous parking. While the operation of the vehicle by the remote autonomous parking is continued, the vehicle moves at a constant speed along a trajectory, so that the user cannot manually change a vehicle speed (moving speed of the vehicle). However, in a case where the user is accustomed to the operation of the vehicle by the remote autonomous parking and no obstacle is present around the area where the remote autonomous parking is executed, the user may feel that the vehicle speed in the remote autonomous parking is low and thus want to increase the vehicle speed. On the other hand, in a case where an obstacle is present around the area where the remote autonomous parking is executed, the user may hope to decrease the vehicle speed even if the user is accustomed to the operation of the vehicle by the remote autonomous parking.

SUMMARY OF THE INVENTION

In view of such a problem of the prior art, a primary object of the present invention is to provide a vehicle control system that can execute a remote autonomous moving process in which a user can stop a vehicle by stopping a reciprocating operation on a terminal and can change a vehicle speed.

To achieve such an object, one embodiment of the present invention provides a vehicle control system (1) including: a terminal (3) configured to be carried by a user; and a control device (15) configured to execute a remote autonomous moving process to move a vehicle from an initial position to a prescribed stop position based on an input from the terminal and to stop the vehicle at the stop position, wherein the remote autonomous moving process proceeds on condition of continuation of a reciprocating operation on the terminal by the user, and has a plurality of modes in which a vehicle speed to move the vehicle is set to values different from each other, and the control device or the terminal is configured to select one of the plurality of modes (ST27, ST28) based on a speed of the reciprocating operation (ST26).

According to this configuration, the user is required to continue the reciprocating operation on the terminal in order to continue moving the vehicle by the remote autonomous moving process, while the user can stop the vehicle by stopping the reciprocating operation. Further, the user can change the mode of the remote autonomous moving process by changing the speed of the reciprocating operation, thereby changing the vehicle speed to a value set for the corresponding mode.

Preferably, the remote autonomous moving process has a low-speed mode in which the vehicle speed is set to a first speed and a high-speed mode in which the vehicle speed is set to a second speed that is higher than the first speed, and the control device or the terminal is configured to select the low-speed mode (ST28) when the speed of the reciprocating operation is less than a prescribed threshold (ST26: No) and to select the high-speed mode (ST27) when the speed of the reciprocating operation is equal to or more than the threshold (ST26: Yes).

According to this configuration, the user can select the low-speed mode and set the vehicle speed to the first speed by performing the reciprocating operation on the terminal at a speed less than the threshold. On the other hand, when hoping to increase the vehicle speed, the user can select the high-speed mode and set the vehicle speed to the second speed by performing the reciprocating operation on the terminal at a speed equal to or more than the threshold. In this way, the vehicle speed is switched between the first speed and the second speed. Accordingly, the user does not have to care a lot about an operation speed to maintain the vehicle speed, and can change the vehicle speed in the remote autonomous moving process by an easy operation of changing the operation speed.

Preferably, the terminal includes: a touch panel (30A) configured to set at least one acceptance area (61) to accept the reciprocating operation by an operation part (62) that can be moved by the user; and a processing unit (33) configured to execute a displaying process of the touch panel and an accepting process of the reciprocating operation on the acceptance area and to cause the touch panel to display the selected one of the plurality of modes.

According to this configuration, the user can check the selected mode (more specifically, the mode selected according to the speed of the reciprocating operation which the user himself/herself performs by the operation part (for example, a user's finger or a stylus)) on the touch panel, so that the vehicle speed of the remote autonomous moving process can be changed surely.

Preferably, the at least one acceptance area comprises a plurality of acceptance areas, and the processing unit is configured to respectively set the acceptance areas in left and right areas of the touch panel and to execute the accepting process based on an input to one of the acceptance areas by the operation part.

According to this configuration, the user can proceed with the remote autonomous moving process by inputting the reciprocating operation to either acceptance area to which the user can input it easily.

Preferably, the speed of the reciprocating operation is a reciprocating speed of a reciprocating slide operation in a prescribed direction on the acceptance area by the operation part.

According to this configuration, the user can change the vehicle speed by changing a reciprocating rhythm of the reciprocating slide operation by the operation part without changing an actual moving speed of the operation part. Accordingly, it is possible to suppress an increase in the operation burden on the user when the high-speed mode is selected and maintained.

Preferably, the terminal is configured to cause the touch panel to display an input screen on which the user inputs the stop position and configured to send information about the inputted stop position to the control device.

According to this configuration, the user can input the stop position by using the terminal, so that the user can specify the stop position without entering a vehicle cabin. Accordingly, for example, it is possible to move the vehicle parked at a position where no space for opening the doors is present on the left and right sides, so that the convenience of the user can be improved.

Preferably, the control device is configured to prohibit the high-speed mode (ST14) when a distance from the vehicle to the stop position becomes equal to or less than a prescribed distance (ST29: Yes).

According to this configuration, when the distance from the vehicle to the stop position becomes equal to or less than the prescribed distance, the vehicle speed becomes the first speed. Accordingly, when hoping to stop the vehicle at or near the stop position, the user can stop the vehicle at a more accurate position.

Preferably, the control device is configured to authenticate the terminal, to count a number of times of the remote autonomous moving process based on the input from the authenticated terminal, and to prohibit the high-speed mode (ST12) when the number of times is equal to or less than a prescribed number of times (ST11: Yes).

According to this configuration, when a user who is not accustomed to the remote autonomous moving process performs it, the vehicle speed is always set to the first speed. Accordingly, it is possible to suppress contact between vehicles and an operation mistake during the remote autonomous moving process.

Thus, according to the above configurations, it is possible to provide a vehicle control system that can execute the remote autonomous moving process in which the user can stop the vehicle by stopping the reciprocating operation on the terminal and can change the vehicle speed.

BRIEF DESCRIPTION OF THE DRAWINGS

FIG. 3 is a sequence diagram of a parking assist process in the vehicle control system according to the embodiment;

DESCRIPTION OF THE PREFERRED EMBODIMENT(S)

Figure 1:
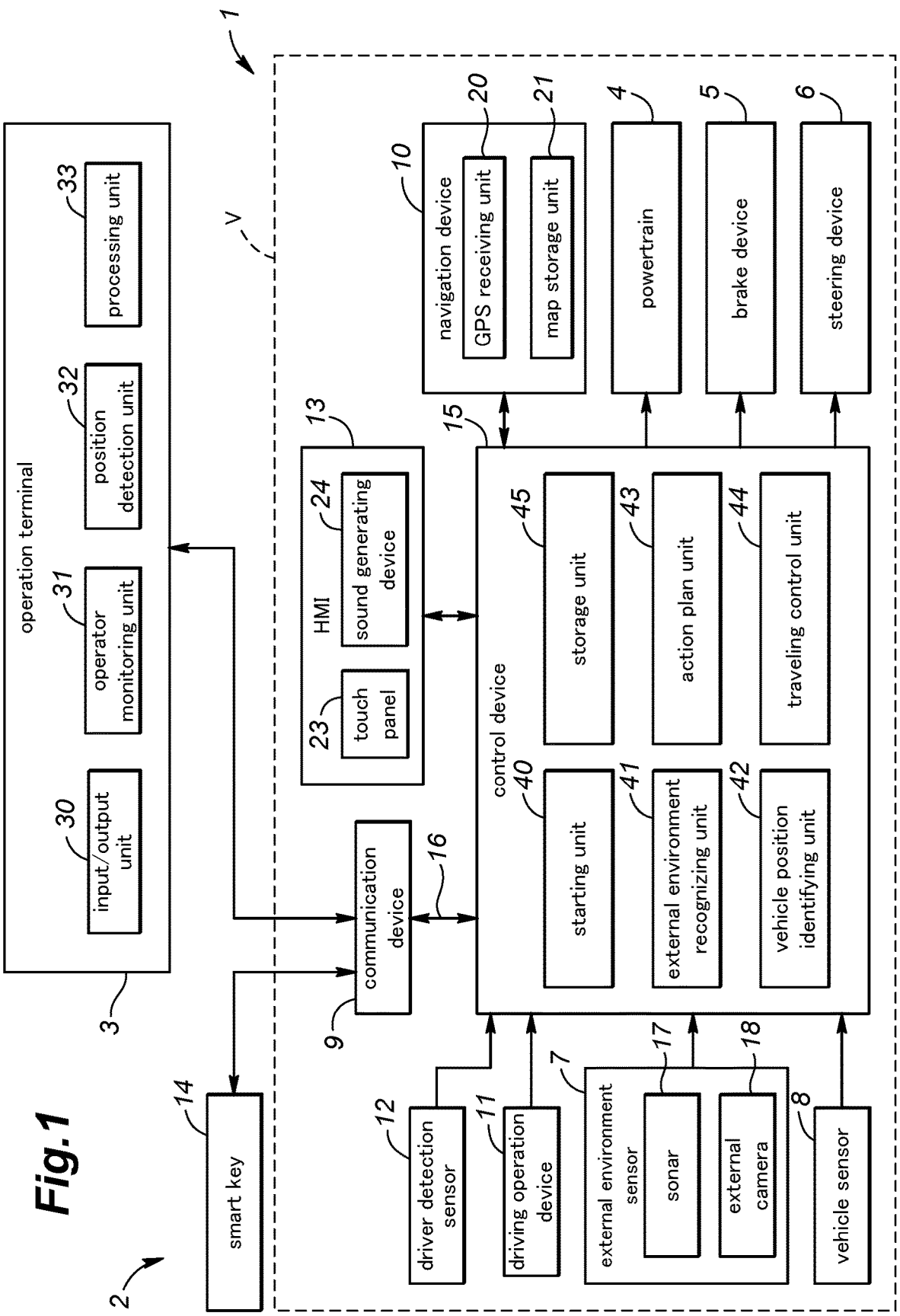
FIG. 1 is a functional block diagram of a vehicle control system according to an embodiment.

As shown in FIG. 1, the vehicle control system 1 includes a vehicle system 2 and at least one operation terminal 3. The vehicle system 2 includes a powertrain 4, a brake device 5, a steering device 6, an external environment sensor 7, a vehicle sensor 8, a communication device 9, a navigation device 10, a driving operation device 11, a driver detection sensor 12, an HMI 13, a smart key 14, and a control device 15. The above components of the vehicle system 2 are connected to each other by communication means such as a controller area network 16 (CAN) so that a signal can be transmitted between the above components. The above components of the vehicle system 2 except the smart key 14 are mounted to the vehicle V.

The powertrain 4 is a device that applies a driving force to the vehicle V. The powertrain 4 includes a power source and a transmission, for example. The power source includes at least one of an internal combustion engine such as a gasoline engine and a diesel engine and an electric motor. The brake device 5 is a device that applies a brake force to the vehicle V. For example, the brake device 5 includes a brake caliper that presses a brake pad against a brake rotor and an electric cylinder that supplies an oil pressure to the brake caliper. The brake device 5 includes a parking brake device that restricts rotations of wheels via wire cables. The steering device 6 is a device for changing a steering angle of the wheels. For example, the steering device 6 includes a rack-and-pinion mechanism that steers (turns) the wheels and an electric motor that drives the rack-and-pinion mechanism. The powertrain 4, the brake device 5, and the steering device 6 are controlled by the control device 15.

The external environment sensor 7 is a sensor that detects electromagnetic waves, sound waves, and the like from the periphery of the vehicle V to detect an object outside the vehicle V. The external environment sensor 7 includes sonars 17 and external cameras 18. The external environment sensor 7 may further include a millimeter wave radar or a laser lidar. The external environment sensor 7 outputs a detection result to the control device 15.

Figure 2A:
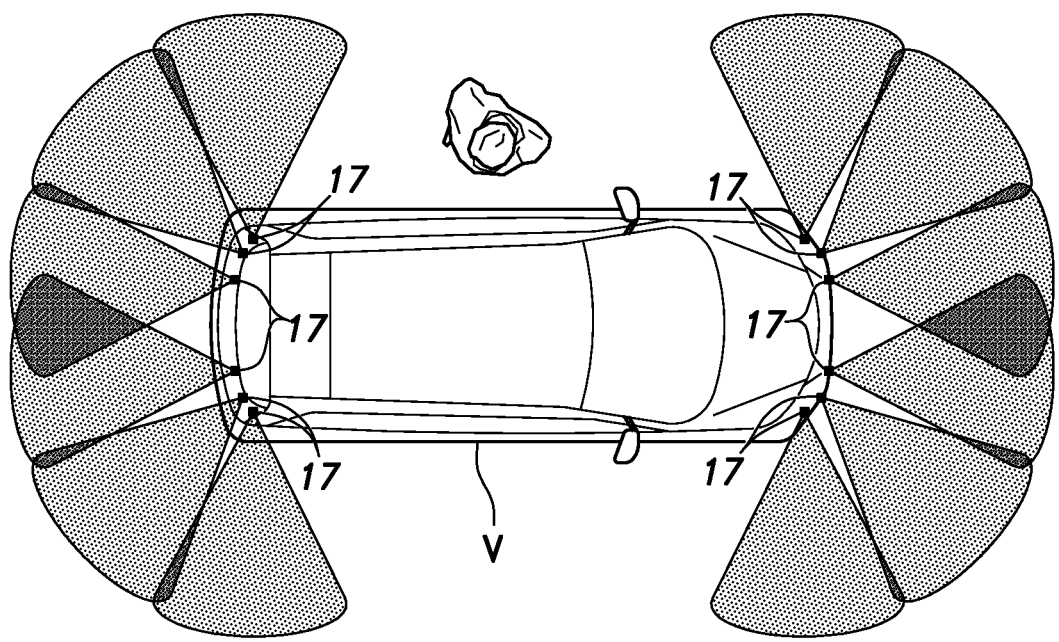
FIG. 2A is a schematic plan view showing sonars provided in a vehicle and their detection areas in the vehicle control system according to the embodiment.

Each sonar 17 consists of a so-called ultrasonic sensor. Each sonar 17 emits ultrasonic waves around the vehicle V and captures the ultrasonic waves reflected by the object to detect a position (distance and direction) of the object. As shown in FIG. 2A, a plurality of sonars 17 are provided at a rear part and a front part of the vehicle V, respectively. In the present embodiment, two pairs of sonars 17 are provided on left and right sides of a rear bumper, two pairs of sonars 17 are provided on left and right sides of a front bumper, and one pair of sonars 17 are provided at front and rear ends of each of left and right faces of the vehicle V. That is, the vehicle V is provided with six pairs of sonars in total. In FIG. 2A, detection areas of the sonars 17 are colored. The sonars 17 provided on the rear bumper mainly detect a position of an object behind the vehicle V. The sonars 17 provided on the front bumper mainly detect a position of an object in front of the vehicle V. The sonars 17 provided at the front ends of the left and right faces of the vehicle V detect a position of an object on left and right outsides of the front end of the vehicle V, respectively. The sonars 17 provided at the rear ends of the left and right faces of the vehicle V detect a position of an object on left and right outsides of the rear end of the vehicle V, respectively.

Figure 2B:
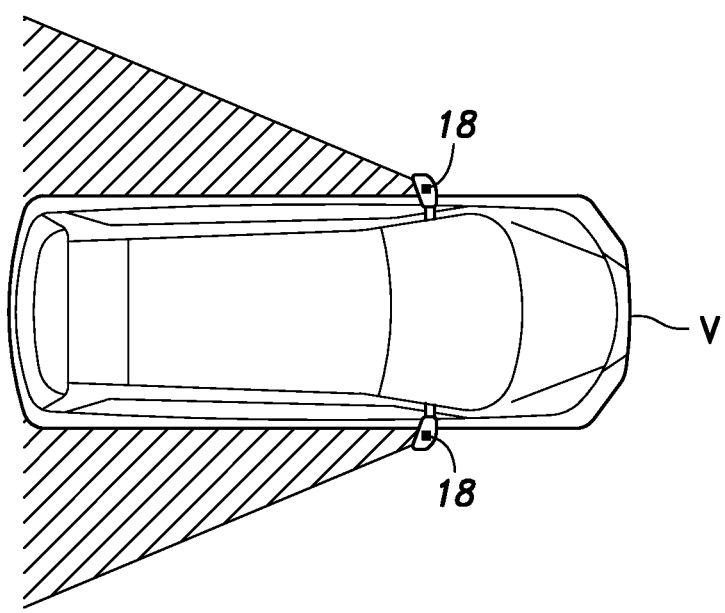
FIG. 2B is a schematic plan view showing door mirror cameras provided in the vehicle and their image capturing areas in the vehicle control system according to the embodiment.

The external cameras 18 are devices that capture images around the vehicle V. Each external camera 18 consists of a digital camera using a solid imaging element such as a CCD or a CMOS, for example. The external cameras 18 include a front camera that captures an image of the front of the vehicle V and a rear camera that captures an image of the rear of the vehicle V. As shown in FIG. 2B, the external cameras 18 include a pair of left and right door mirror cameras that are provided in the vicinity of the door mirrors of the vehicle V to capture images behind left and right sides of the vehicle V. In FIG. 2B, image capturing areas (detection areas) of the door mirror cameras are hatched. The external cameras 18 may include a pair of left and right pillar cameras provided on center pillars (B pillars) of the vehicle V to capture images of left and right outsides of the vehicle V.

The vehicle sensor 8 includes a vehicle speed sensor that detects the speed of the vehicle V, an acceleration sensor that detects the acceleration of the vehicle V, a yaw rate sensor that detects the angular velocity around a vertical axis of the vehicle V, and a direction sensor that detects the direction of the vehicle V. For example, the yaw rate sensor consists of a gyro sensor.

The communication device 9 mediates (relays) wireless communication between the control device 15 and the operation terminal 3. Thereby, the control device 15 can communicate with the operation terminal 3 carried by the user via the communication device 9. The communication device 9 may utilize a known communication method such as infrared communication or Bluetooth (registered trademark), for example.

The navigation device 10 is a device that obtains a current position of the vehicle V and provides route guidance to a destination and the like. The navigation device 10 includes a GPS receiving unit 20 and a map storage unit 21. The GPS receiving unit 20 identifies a position (latitude and longitude) of the vehicle V based on a signal received from an artificial satellite (positioning satellite). The map storage unit 21 consists of a known storage device such as a flash memory or a hard disk, and stores map information.

The driving operation device 11 is provided in a vehicle cabin of the vehicle V and accepts an input operation (driving operation) by the driver (user) to control the vehicle V. The driving operation device 11 includes an accelerator pedal, a brake pedal, a steering wheel, a shift lever, and a push start switch (engine start button). The push start switch accepts a starting operation of the vehicle V (input operation to start operation of the vehicle V) by the driver. The driving operation device 11 may further include an element to activate the parking brake device. The driving operation device 11 includes a sensor that detects an operation amount of the input operation, and outputs a signal indicating the operation amount of the input operation to the control device 15.

The driver detection sensor 12 is a sensor to detect that the driver (user) is sitting on a driver's seat. For example, the driver detection sensor 12 consists of a seat sensor provided on a seat surface of the driver's seat. The seat sensor may consist of a capacitance-type sensor to detect a change in capacitance, or may consist of a membrane-type switch that is turned on when the driver sits on the driver's seat. Alternatively, the driver detection sensor 12 may consist of an indoor camera that captures an image of the driver sitting on the driver's seat. Alternatively, the driver detection sensor 12 may consist of a seat belt sensor to detect that the driver fastens a seat belt of the driver's seat based on information as to whether a tongue of the seat belt is inserted into a buckle thereof. The driver detection sensor 12 outputs a detection result to the control device 15.

The HMI 13 notifies the user of various kinds of information by a display or a voice, and accepts an input operation by the user. For example, the HMI 13 includes a touch panel 23 that accepts the input operation by the user and a sound generating device 24 such as a buzzer and a speaker. The touch panel 23 includes a liquid crystal display, an organic EL display, and the like.

The control device 15 consists of an electronic control device (ECU) that includes a CPU, a nonvolatile memory such as a ROM, a volatile memory such as a RAM, and the like. The CPU executes an operation process according to a program so that the control device 15 executes various types of vehicle control. The control device 15 may be composed of one piece of hardware, or may be composed of a unit including plural pieces of hardware. Further, the functions of the control device 15 may be at least partially executed by hardware such as an LSI, an ASIC, and an FPGA, or may be executed by a combination of software and hardware.

The smart key 14 (FOB key) is a known wireless terminal that can be carried by the user. The smart key 14 can communicate with the control device 15 from outside the vehicle V via the communication device 9. The smart key 14 includes a button to accept input by the user. The user can release a door lock and start the operation of the vehicle V by operating the button of the smart key 14.

The operation terminal 3 consists of a wireless terminal that can be carried by the user, and can communicate with the control device 15 from outside the vehicle V via the communication device 9. In the present embodiment, the operation terminal 3 consists of a smartphone. A prescribed application is installed on the operation terminal 3 in advance so that the operation terminal 3 can communicate with the control device 15. The operation terminal 3 is provided with a terminal ID, which is a prescribed numerical value to identify the operation terminal 3.

As shown in FIG. 1, the operation terminal 3 includes an input/output unit 30, an operator monitoring unit 31, a position detection unit 32, and a processing unit 33.

The input/output unit 30 provides information to the user operating the operation terminal 3, and accepts input by the user operating the operation terminal 3. The input/output unit 30 consists of a touch panel 30A (see FIGS. 4A and 4B), for example. When the input/output unit 30 accepts the input by the user, the input/output unit 30 outputs a signal corresponding to the input to the processing unit 33.

The operator monitoring unit 31 is a unit that captures an image of the user operating the operation terminal 3. The operator monitoring unit 31 consists of a digital camera using a solid imaging element such as a CMOS, for example.

The operator monitoring unit 31 is provided at a position to capture an image of a face including eyes of the user performing the input to the input/output unit 30.

The position detection unit 32 obtains positional information of the operation terminal 3. The position detection unit 32 may obtain the positional information of the operation terminal 3 by receiving a signal from a geodetic satellite (GPS satellite), for example. Alternatively, the position detection unit 32 may obtain information about a position of the operation terminal 3 relative to the vehicle V by communicating with the control device 15 via the communication device 9. The position detection unit 32 outputs the obtained positional information of the operation terminal 3 to the processing unit 33.

The processing unit 33 sends the control device 15 the signal from the input/output unit 30, the image of the user captured by the operator monitoring unit 31, and the positional information of the operation terminal 3 obtained by the position detection unit 32. Also, when the processing unit 33 receives a signal from the control device 15, the processing unit 33 processes the signal from the control device 15 and makes the input/output unit 30 provide information to the user operating the operation terminal 3. The input/output unit 30 may provide the information to the user by displaying the information thereon, for example.

The control device 15 can start the operation of the vehicle V (namely, the driving of the powertrain 4) based on a signal from the operation terminal 3. Also, the control device 15 can execute remote parking to move the vehicle V to a prescribed position and park the vehicle V there based on a signal from the operation terminal 3. To control the vehicle V at this time, the control device 15 at least includes a starting unit 40, an external environment recognizing unit 41, a vehicle position identifying unit 42, an action plan unit 43, a traveling control unit 44, and a storage unit 45.

The starting unit 40 executes authentication of the smart key 14 based on a signal from the push start switch included in the driving operation device 11. Also, the starting unit 40 determines whether the smart key 14 is located in the vehicle V. In a case where the authentication of the smart key 14 succeeds and the starting unit 40 determines that the smart key 14 is located inside the vehicle V, the starting unit 40 starts the driving of the powertrain 4 (namely, the starting unit 40 starts the operation of the vehicle V). Also, in a case where the control device 15 receives a signal that instructs a start of the operation of the vehicle V from the operation terminal 3, the starting unit 40 executes authentication of the operation terminal 3. In a case where the authentication of the operation terminal 3 succeeds, the starting unit 40 starts the driving of the powertrain 4 (namely, the starting unit 40 starts the operation of the vehicle V). In a case where the powertrain 4 includes an internal combustion engine, the starting unit 40 turns on an ignition device when the starting unit 40 starts the driving of the powertrain 4.

The external environment recognizing unit 41 recognizes an obstacle (for example, a parked vehicle or a wall) located around the vehicle V based on the detection result of the external environment sensor 7, and thereby obtains information about the obstacle. Further, the external environment recognizing unit 41 analyzes an image captured by the external cameras 18 based on a known image analysis method such as pattern matching, and thereby determines whether the obstacle is present and obtains the size of the obstacle in a case where the obstacle is present. Further, the external environment recognizing unit 41 may compute a distance to the obstacle based on signals from the sonars 17 to obtain the position of the obstacle.

The vehicle position identifying unit 42 identifies the position of the vehicle V based on a signal from the GPS receiving unit 20 of the navigation device 10. Further, the vehicle position identifying unit 42 may obtain the vehicle speed and yaw rate of the vehicle V from the vehicle sensor 8, in addition to the signal from the GPS receiving unit 20, to identify the position and posture of the vehicle V by so-called inertial navigation.

The external environment recognizing unit 41 analyzes the detection result of the external environment sensor 7 (more specifically, the images captured by the external cameras 18) based on a known image analysis method such as pattern matching, and thereby recognizes a position of a white line on a road surface of a parking area, for example.

The traveling control unit 44 controls the powertrain 4, the brake device 5, and the steering device 6 based on a traveling control instruction from the action plan unit 43 to make the vehicle V travel.

The storage unit 45 consists of a RAM and the like, and stores information necessary for executing processes of the action plan unit 43 and the traveling control unit 44.

When the HMI 13 or the operation terminal 3 accepts an input by the user, the action plan unit 43 computes a trajectory (traveling route) of the vehicle V and outputs the traveling control instruction to the traveling control unit 44, if necessary.

After the vehicle V has stopped, the action plan unit 43 executes a parking assist process, when the user performs an input corresponding to desire for parking assistance (remote parking assistance) by a remote operation. In the following, the parking assist process will be described with reference to a sequence diagram of FIG. 3.

First, the action plan unit 43 executes an obtaining process to obtain at least one space to park the vehicle V (hereinafter referred to as "available parking position"). Specifically, the action plan unit 43 makes the touch panel 23 of the HMI 13 display a notification that instructs the driver to drive the vehicle V straight. While the driver is driving the vehicle V straight, the action plan unit 43 obtains the position and size of the obstacle and the position of the white line on the road surface based on the signal from the external environment sensor 7. The action plan unit 43 extracts the at least one available parking position based on the position and size of the obstacle and the position of the white line.

Next, the action plan unit 43 executes a parking position accepting process to accept a selection of a position to park the vehicle V (hereinafter referred to as "parking position") from the at least one available parking position. More specifically, the action plan unit 43 makes the touch panel 23 display a notification that instructs the user to stop the vehicle V, in a case where the action plan unit 43 extracts the at least one available parking position in the above obtaining process. At this time, the action plan unit 43 may make the touch panel 23 also display a notification that instructs the user to change a position of the shift lever to the parking position after the vehicle V has stopped.

Next, the action plan unit 43 makes the touch panel 23 display the current position of the vehicle V and the at least one available parking position. At this time, the action plan unit 43 may make the touch panel 23 display the current position of the vehicle V and the at least one available parking position on the image obtained by the external cameras 18. Thereafter, the action plan unit 43 makes the touch panel 23 display a notification that instructs the user to select the parking position from the at least one available parking position. When the user inputs a desired parking position to the touch panel 23, the touch panel 23 outputs a signal corresponding to the inputted parking position to the action plan unit 43. At this time, the action plan unit 43 may identify the desired parking position based on a position where the user touches the touch panel 23. At this time, the action plan unit 43 makes the touch panel 23 display a button for the user to select a parking direction (a forward parking direction or a backward parking direction). At this time, the action plan unit 43 may simply compute a pair of routes from the current position of the vehicle V to the parking position such that each route corresponds to the forward parking direction or the backward parking direction, and may make the touch panel 23 display the pair of routes. In such a case, the touch panel 23 may permit the user to select the parking direction by touching one of the pair of routes, and may output the selection result (namely, selected parking direction) to the action plan unit 43.

Next, when the action plan unit 43 receives the parking position inputted by the user from the touch panel 23, the action plan unit 43 executes a trajectory computation process to compute a trajectory of the vehicle V from the current position to the parking position. In this process, in a case where the user performs the input to select the parking direction, the action plan unit 43 may compute the trajectory of the vehicle V based on not only the current position and the parking position but also the parking direction selected by the user.

When the computation of the trajectory of the vehicle V is completed, the action plan unit 43 makes the touch panel 23 display a notification that urges the user to get off the vehicle V and a notification that instructs the user to start dedicated application software for the remote parking process (hereinafter referred to as "remote parking application") in the operation terminal 3. According to these notifications, the user gets off the vehicle V, and then starts the remote parking application in the operation terminal 3.

Thereafter, the input/output unit 30 of the operation terminal 3 displays an input button to connect the operation terminal 3 to the vehicle V and to start the authentication of the operation terminal 3. When the user operates (for example, touches or pushes) the input button, the operation terminal 3 is connected to the vehicle V and the action plan unit 43 executes a terminal authentication process to execute the authentication of the operation terminal 3 connected to the vehicle V. In the terminal authentication process, the operation terminal 3 sends the action plan unit 43 an authentication request signal including the terminal ID of the operation terminal 3. The action plan unit 43 executes the authentication (determination) of the operation terminal 3 based on the terminal ID of the operation terminal 3. When the action plan unit 43 succeeds in the authentication of the operation terminal 3, the action plan unit 43 sends the operation terminal 3 a signal to notify authentication success, and then the input/output unit 30 of the operation terminal 3 displays the current position, trajectory, and parking position of the vehicle V and a vertical arrow. Thereby, the user can instruct the action plan unit 43 to execute a remote autonomous parking process (remote parking process) by performing the input to the input/output unit 30 of the operation terminal 3. The remote autonomous parking process includes a moving process to move the vehicle V from the current position to the parking position and a parking process to park the vehicle V at the parking position. Further, the action plan unit 43 counts the number of times of a remote autonomous moving process (for example, the remote autonomous parking process) based on the input from the authenticated operation terminal 3, and stores the counted number of times in the storage unit 45.

When the user repeatedly inputs a prescribed operation (for example, a swiping operation) on one of acceptance areas 61 (see FIGS. 4A and 4B) displayed on the input/output unit 30 of the operation terminal 3, the operation terminal 3 sends an operation speed signal to the action plan unit 43. The operation speed signal corresponds to an input of the repetitive operation (reciprocating operation) and the operation speed thereof. The action plan unit 43 converts the operation speed signal to a moving speed of the vehicle V (namely, the vehicle speed), thereby executing the moving process to move the vehicle V to the parking position along the trajectory at the computed moving speed.

During this moving process, the action plan unit 43 determines whether the vehicle V has reached the parking position. When the action plan unit 43 determines that the vehicle V has reached the parking position, the action plan unit 43 executes the parking process to park the vehicle V. In this parking process, the action plan unit 43 first sends a stopping control instruction to the traveling control unit 44 to activate the brake device 5. Thereafter, the action plan unit 43 activates the parking brake device. When the parking process is completed, the action plan unit 43 sends a notification of parking completion, which indicates that the parking process has been completed, to the operation terminal 3.

When the operation terminal 3 receives the notification of parking completion, the input/output unit 30 of the operation terminal 3 displays a notification to indicate that the parking of the vehicle V has been completed, and the operation terminal 3 ends the remote parking application. Thereby, the remote autonomous parking process is completed.

In the following, the following matters 1-2 in the above remote autonomous parking process are described with reference to FIGS. 1 and 4 to 6.

1. the specific operation of the operation terminal 3 by the user
2. the control of the vehicle V and the response to the operation terminal 3 by the control device 15 that has received a signal corresponding to the specific operation from the operation terminal 3

Incidentally, the present embodiment can be widely applied to not only the remote parking process but also a moving process of the vehicle V from an arbitrary initial position to an arbitrary stop position within a range that can be monitored by the user (for example, a moving process to move a parked vehicle V to a position where the user will get on the vehicle V). Namely, "current position", "parking position", "parking process" and "remote autonomous parking process" in the above description can be rephrased as "initial position", "stop position", "stop process", and "remote autonomous moving process", respectively.

The stop position can be input not only from the touch panel 23 of the HMI 13 but also from the touch panel 30A (input/output unit 30) of the operation terminal 3. The processing unit 33 makes the input/output unit 30 display an input screen on which the user inputs the stop position, and sends information about the stop position input by the user to the control device 15. For example, there may be a case where the user wants to move the vehicle V parked at a position with no space to open/close the doors on the left and right. In such a case, the user can input one of the following positions 1-3 as the stop position.

1. a position where the vehicle V moves forward or backward by vehicle length or so
2. a position where the user has alighted from the vehicle V to park it 3. a position where the vehicle V moves forward or backward so that the control device 15 can determine that the doors can be opened/closed based on information obtained by the external environment sensor 7

In this way, the user can identify the stop position without entering the vehicle V, so that the vehicle control system 1 can be more convenient for the user.

Figure 4B:
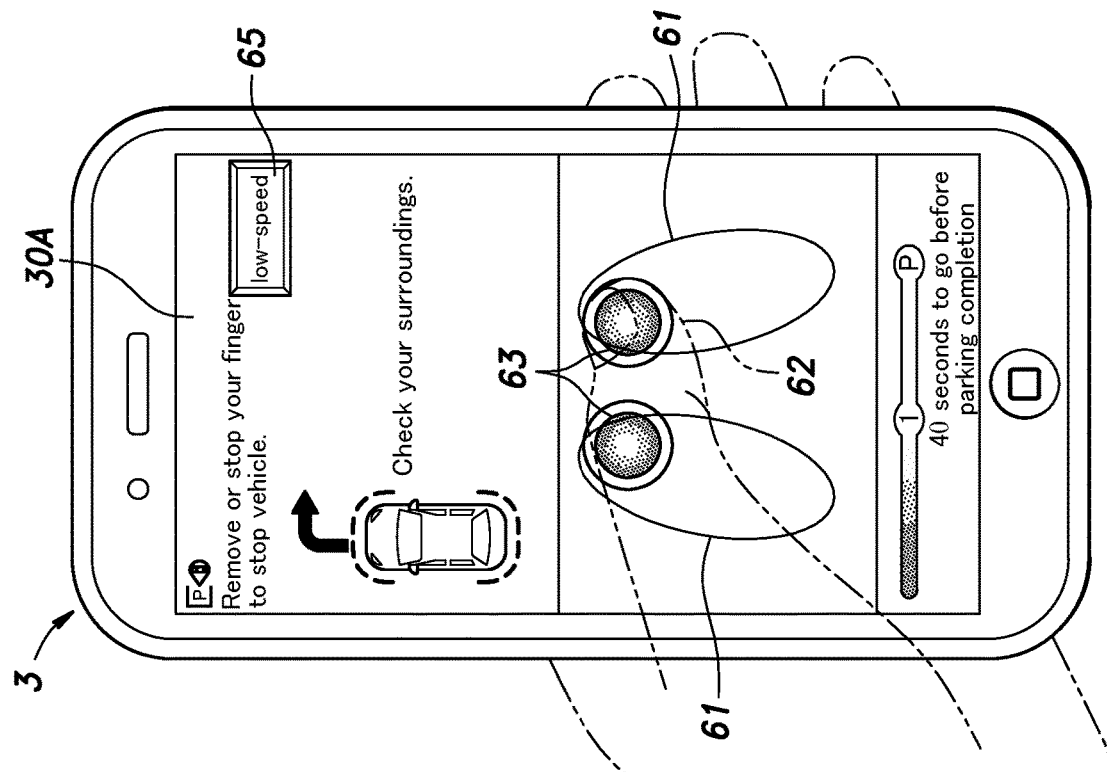
FIG. 4B is explanatory diagram showing a screen display of the operation terminal in the vehicle control system according to the embodiment.
Figure 4A:
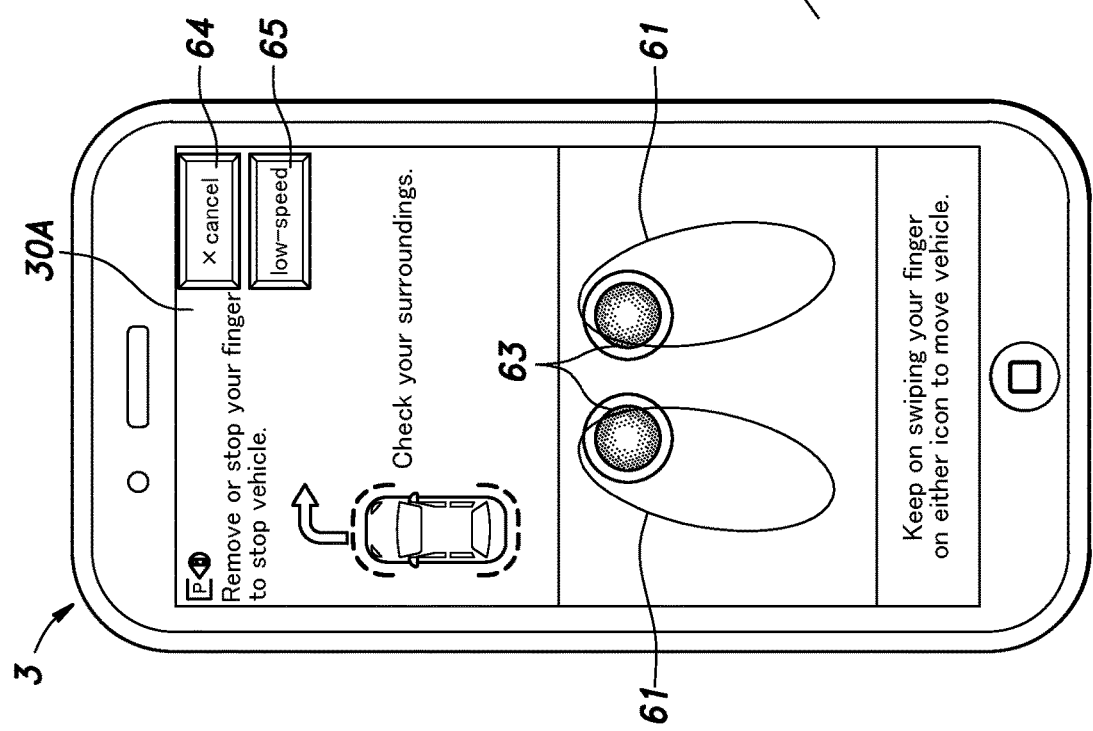
FIG. 4A is explanatory diagram showing a screen display of an operation terminal in the vehicle control system according to the embodiment.

During the remote autonomous moving process, the user operates the touch panel 30A of the operation terminal 3 from outside the vehicle V, thereby starting to move the vehicle V in a stopped state. As shown in FIGS. 4A and 4B, the touch panel 30A displays the acceptance areas 61 to accept an operation by the user. The acceptance areas 61 each have an elliptical shape elongated in the vertical direction. The acceptance areas 61 are displayed in pairs on left and right sides of a lower part of the touch panel 30A. Each acceptance area 61 is configured to accept a slide operation by an operation part 62 (for example, a user's finger or a stylus) that can be moved by the user of his/her own will. A circular icon 63 is displayed near one end (upper end in an example of FIGS. 4A and 4B) in the longitudinal direction of each acceptance area 61. The user touches the icon 63 with the operation part 62 and then slides the operation part 62 on the touch panel 30A (namely, the user swipes the operation part 62 on the touch panel 30A), thereby moving the icon 63.

FIG. 4A shows the touch panel 30A in a state where the user has not yet swiped the operation part 62 on the icon 63 (namely, in a state where the vehicle V is stopped). FIG. 4B shows the touch panel 30A in a state where the user touches the icon 63 with the operation part 62 and swipes the operation part 62 (namely, in a state where the vehicle V is moving). As shown in FIG. 4B, the acceptance area 61 on the right side is inclined such that the upper part thereof is offset toward a left side (toward the center of the touch panel 30A) from the lower part thereof so that the user can easily input the reciprocating operation with the thumb of the left hand when holding the operation terminal 3 with the left hand. The acceptance area 61 on the left side is inclined such that the upper part thereof is offset toward a right side (toward the center of the touch panel 30A) from the lower part thereof so that the user can easily input the reciprocating operation with the thumb of the right hand when holding the operation terminal 3 with the right hand.

On a left side of an upper part of the touch panel 30A, the vehicle V, a state of the vehicle V (in the present embodiment, a shift range (P: parking range, D: driving range, R: reverse range, or the like) of the transmission), and an arrow indicating the moving direction of the vehicle V are displayed. The arrow indicating the moving direction of the vehicle V is displayed inconspicuously while the vehicle V is stopped, and is displayed conspicuously while the vehicle V is moving. An explanation "Check your surroundings." is displayed on one side of the vehicle V to draw user's attention, an explanation "Remove or stop your finger to stop vehicle." is displayed in front of the vehicle V (an upper end of the screen).

As shown in FIG. 4A, at a lower end of the touch panel 30A before the swiping operation, an explanation "Keep on swiping your finger on either icon to move vehicle." (an explanation for operating the screen) is displayed. When the operation part 62 is swiped in the vertical direction on the icon 63 displayed in either acceptance area 61, the processing unit 33 of the operation terminal 3 accepts this swiping operation as an input of the reciprocating operation. In this way, the processing unit 33 respectively sets the acceptance areas 61 in left and right areas of the touch panel 30A. Accordingly, the user can proceed with the remote autonomous moving process and move the vehicle V as described later by inputting the reciprocating operation to either acceptance area 61 to which the user can input it easily.

On a right side of the upper part of the touch panel 30A, a cancellation button 64 and a mode displaying part 65 are displayed. The cancellation button 64 is configured to accept a cancellation operation of the remote autonomous moving process by the user. The mode displaying part 65 is configured to display a plurality of modes (a high-speed mode and a low-speed mode) in which the vehicle speed in the remote autonomous moving process is set to values different from each other.

In the low-speed mode, the moving speed (the vehicle speed) of the vehicle V in the remote autonomous moving process is set to a first speed (for example, 2 km/h). In the high-speed mode, the moving speed (the vehicle speed) of the vehicle V in the remote autonomous moving process is set to a second speed (for example, 4 km/h). The first and second speeds may be set to the same value or different values regarding forward and backward movements of the vehicle V. The second speed set in the high-speed mode is higher than the first speed set in the low-speed mode regarding at least one of the forward and backward movements of the vehicle V, and is equal to or more than the first speed regarding both forward and backward movements of the vehicle V. By default, the high-speed mode is prohibited and only the low-speed mode is selectable.

On the other hand, as shown in FIG. 4B, at a lower end of the touch panel 30A during the swiping operation, a bar showing the progress of the remote autonomous moving process and time to go before parking completion are displayed. As shown in FIG. 4B, the cancellation button 64 is not shown on the touch panel 30A during the swiping operation, and only the mode displaying part 65 is displayed on the right side of the upper part of the touch panel 30A. The mode displaying part 65 is configured to display a selected mode ("low-speed" or "high-speed") or a selectable mode ("low-speed" or "low-speed/high-speed").

Figure 5:
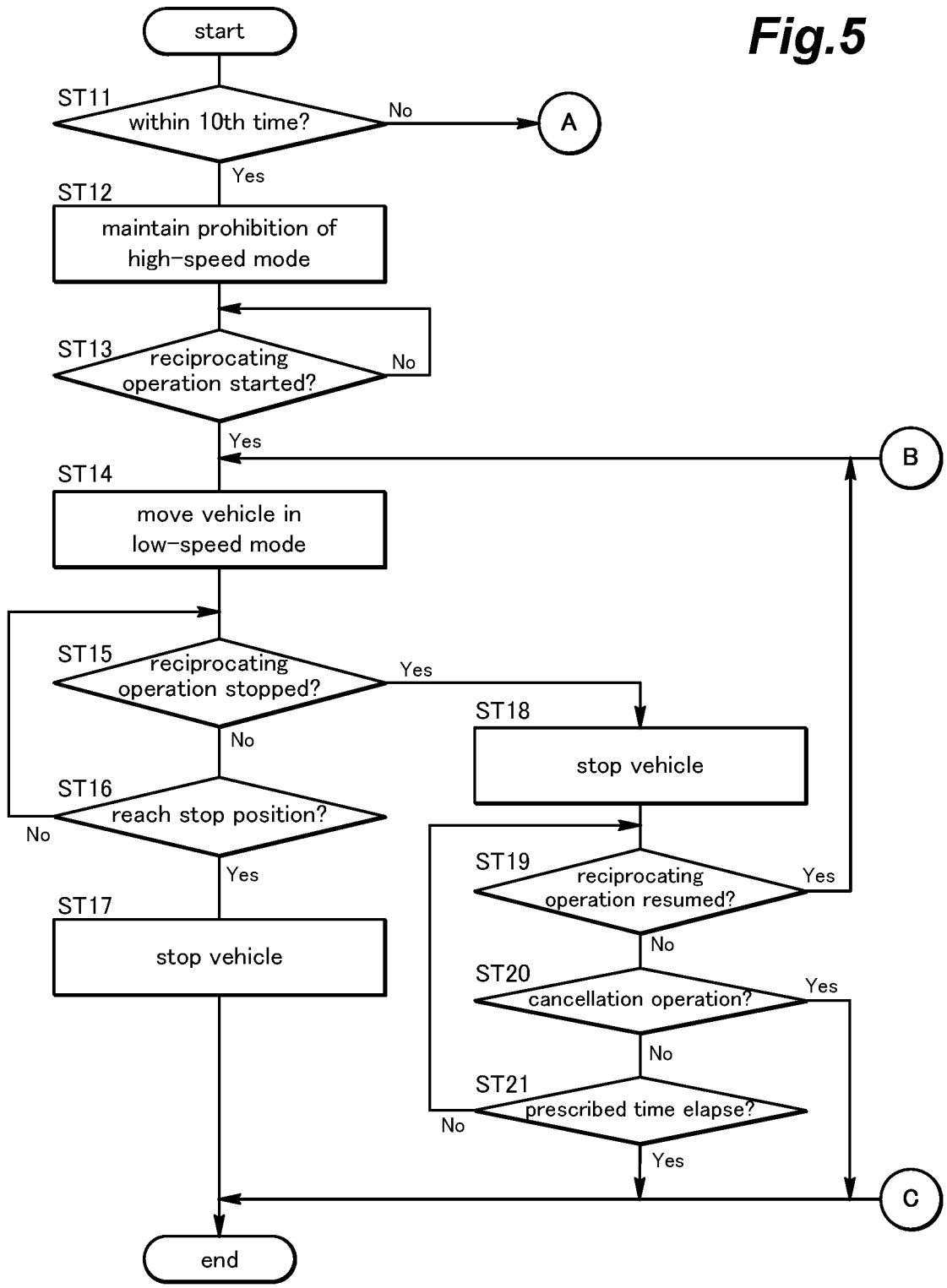
FIG. 5 is a flowchart showing a remote autonomous parking process in the vehicle control system according to the embodiment.
Figure 6:
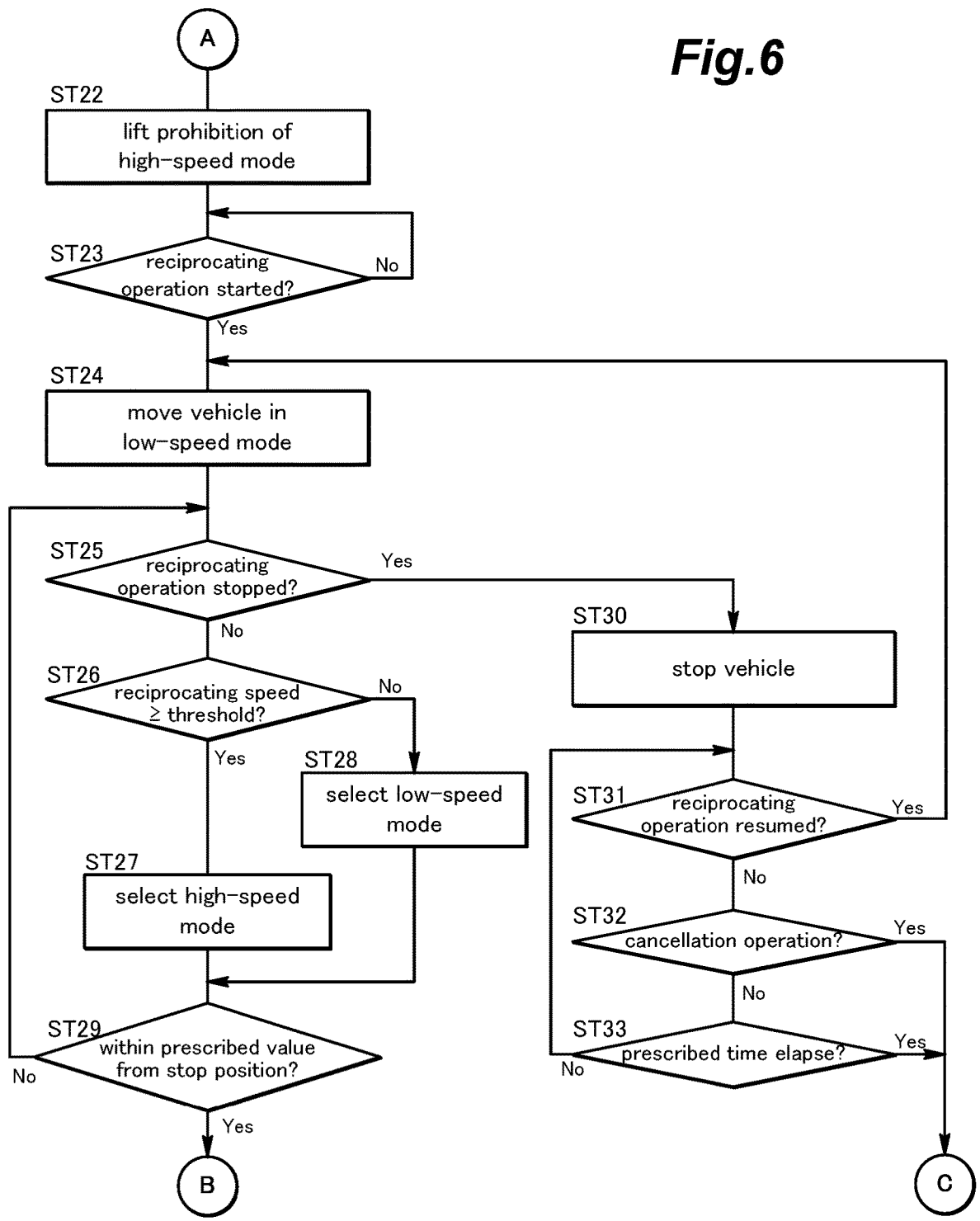
FIG. 6 is a flowchart showing the remote autonomous parking process in the vehicle control system according to the embodiment.

Upon starting the remote autonomous moving process (remote autonomous parking process), the control device 15 executes various processes according to the procedure shown in FIGS. 5 and 6. First, the action plan unit 43 determines whether the number of times of the remote autonomous moving process by the operation terminal 3 authenticated in the terminal authentication process is within the 10th time (ST11). In a case where the number of times of the remote autonomous moving process by this operation terminal 3 is within the 10th time (ST11: Yes), the action plan unit 43 maintains the prohibition of the high-speed mode set by default (ST12). In this case, the mode displaying part 65 (see FIGS. 4A and 4B) of the operation terminal 3 displays "low-speed" as the selectable mode.

Subsequently, the action plan unit 43 determines whether the reciprocating operation on either acceptance area 61 of the operation terminal 3 by the user is started (ST13). In a case where the reciprocating operation is not started (ST13: No), the action plan unit 43 repeats the process of ST13. In a case where the reciprocating operation is started and thus the determination in ST13 becomes "Yes", the action plan unit 43 starts a process of moving the vehicle V along the trajectory in the low-speed mode (ST14). To be precise, the action plan unit 43 outputs an instruction to move the vehicle V at the first speed (for example, 2 km/h) set in the low-speed mode to the traveling control unit 44. In the following, an expression "the action plan unit 43 outputs an instruction to move (or stop) the vehicle V to the traveling control unit 44" will be replaced with an expression "the action plan unit 43 moves (or stops) the vehicle V".

The movement of the vehicle V continues unless the user stops the reciprocating operation (ST15: Yes) or the vehicle V reaches the stop position (ST16: Yes). Namely, the remote autonomous moving process proceeds on condition of repetition (continuation) of the reciprocating operation on the operation terminal 3 by the user. While the vehicle V is moving, the touch panel 30A of the operation terminal 3 displays the screen shown in FIG. 4B. Accordingly, the arrow indicating the moving direction of the vehicle V is displayed conspicuously and the mode displaying part 65 displays "low-speed" as the selected mode.

When the vehicle V reaches the stop position (ST16: Yes) while the vehicle V is moving and the reciprocating operation by the user is continued (ST15: No), the action plan unit 43 stops the vehicle V at the stop position (ST17) and ends this process. On the other hand, when the reciprocating operation by the user is stopped (ST15: Yes) before the vehicle V reaches the stop position (ST16: No), the action plan unit 43 stops the vehicle V at a position before the stop position on the trajectory (ST18).

Subsequently, the action plan unit 43 determines whether the reciprocating operation on either acceptance area 61 of the operation terminal 3 by the user is resumed (ST19). In a case where the reciprocating operation by the user is not resumed (ST19: No) and the cancellation operation on the cancellation button 64 is inputted (ST20: Yes), or in a case where a prescribed time elapses (ST21: Yes), the action plan unit 43 ends this process. When the reciprocating operation by the user is resumed (ST19: Yes) before the prescribed time elapses (ST21: No), the action plan unit 43 returns the process to ST14 and starts to move the vehicle V in the low-speed mode.

On the other hand, in a case where the number of times of the remote autonomous moving process by the operation terminal 3 authenticated in the terminal authentication process exceeds the 10th time (ST11: No), the action plan unit 43 proceeds to ST22 in FIG. 6 and lifts the prohibition of the high-speed mode set by default. When the action plan unit 43 lifts the prohibition of the high-speed mode, the mode displaying part 65 (see FIGS. 4A and 4B) of the operation terminal 3 displays "low-speed/high-speed" as the selectable mode.

Subsequently, the action plan unit 43 determines whether the reciprocating operation on either acceptance area 61 of the operation terminal 3 by the user is started (ST23). In a case where the reciprocating operation is not started (ST23: No), the action plan unit 43 repeats the process of ST23. When the reciprocating operation is started and thus the determination in ST23 becomes "Yes", the action plan unit 43 starts to move the vehicle V in the low-speed mode (ST24).

While the vehicle V is moving, the action plan unit 43 determines whether the speed of the reciprocating operation on either acceptance area 61 of the operation terminal 3 by the operation part 62 is equal to or more than a prescribed threshold (ST26). Here, "the speed of the reciprocating operation" does not mean a moving speed of the operation part 62 on the touch panel 30A but means a repetitive speed (reciprocating speed) of a reciprocating slide operation in the vertical direction on either acceptance area 61 (see FIGS. 4A and 4B) of the touch panel 30A. For example, the speed of the reciprocating operation is a reciprocal number of the time required for one round (one up-and-down movement) of the reciprocating operation, which is repeatedly inputted to either acceptance area 61 with a prescribed slide distance in the upward direction (going route) and the downward direction (returning route). For example, the threshold is set to 1 time/s or 0.9 time/s. Alternatively, a hysteresis may be set for the threshold to prevent the mode from being switched frequently, and thus the threshold used in the low-speed mode may be set to a value greater than the threshold used in the high-speed mode.

In a case where the speed of the reciprocating operation (reciprocating speed) is equal to or more than the threshold (ST26: Yes), the action plan unit 43 selects the high-speed mode (ST27). Accordingly, the moving speed of the vehicle V is set to the second speed (for example, 4 km/h). On the other hand, in a case where the speed of the reciprocating operation (reciprocating speed) is less than the threshold (ST26: No), the action plan unit 43 selects the low-speed mode (ST28). Accordingly, the moving speed of the vehicle V is set to the first speed (for example, 2 km/h).

In this way, the user can select the low-speed mode and set the vehicle speed to the first speed by performing the reciprocating operation on the operation terminal 3 at a speed less than the threshold. On the other hand, when hoping to increase the vehicle speed, the user can select the high-speed mode and set the vehicle speed to the second speed by performing the reciprocating operation on the operation terminal 3 at a speed equal to or more than the threshold. In this way, the vehicle speed is switched between the first speed and the second speed. Accordingly, the user does not have to care a lot about an operation speed to maintain the vehicle speed, and can change the vehicle speed in the remote autonomous moving process by an easy operation of changing the operation speed.

The movement of the vehicle V in the low-speed mode or the high-speed mode continues unless the user stops the reciprocating operation (ST25: Yes) or the vehicle V reaches a position within a prescribed value (for example, 50 cm) from the stop position (ST29: Yes). While the vehicle V is moving, the touch panel 30A of the operation terminal 3 displays a screen shown in FIG. 4B, in which an arrow indicating the moving direction of the vehicle V is displayed conspicuously and the mode displaying part 65 displays "low-speed" or "high-speed" as the selected mode. In this way, the processing unit 33 of the operation terminal 3 executes a displaying process to display the selected mode on the touch panel 30A. Accordingly, the user can check the selected mode (more specifically, the mode selected according to the speed of the reciprocating operation which the user himself/herself performs by using the operation part 62) on the touch panel 30A, thereby surely changing the vehicle speed of the remote autonomous moving process to a vehicle speed in a desired mode.

In this way, the speed of the reciprocating operation determined in ST26 is the reciprocating speed of the reciprocating slide operation in a prescribed direction on either acceptance area 61 by the operation part 62. Accordingly, the user can change the vehicle speed by changing a reciprocating rhythm of the reciprocating slide operation by the operation part 62 without changing an actual moving speed of the operation part 62. Accordingly, it is possible to suppress an increase in the operation burden on the user when the high-speed mode is selected and maintained.

When the reciprocating operation by the user is stopped (ST25: Yes) before the vehicle V reaches the position within the prescribed value from the stop position (ST29: No), the action plan unit 43 stops the vehicle V at a position separated from the stop position by the prescribed value or more on the trajectory (ST30).

Subsequently, the action plan unit 43 determines whether the reciprocating operation on either acceptance area 61 of the operation terminal 3 by the user is resumed (ST31). In a case where the reciprocating operation by the user is not resumed (ST31: No) and the cancellation operation on the cancellation button 64 is inputted (ST32: Yes), or in a case where a prescribed time elapses (ST33: Yes), the action plan unit 43 advances the process to "C" and ends this process as shown in FIG. 5. When the reciprocating operation by the user is resumed (ST31: Yes) before the prescribed time elapses (ST33: No), the action plan unit 43 returns the process to ST24 and starts to move the vehicle V in the low-speed mode.

When the vehicle V reaches the position within the prescribed value from the stop position (ST29: Yes) while the vehicle V is moving and the reciprocating operation by the user is continued (ST25: No), the action plan unit 43 advances the process to "B" and moves the vehicle V in the low-speed mode as shown in FIG. 5 (ST14). Namely, the action plan unit 43 prohibits the selection of the high-speed mode (ST27) in a case where the speed of the reciprocating operation is equal to or more than the threshold (ST26: Yes).

In this way, when the distance from the vehicle V to the stop position becomes equal to or less than a prescribed distance (ST29: Yes), the action plan unit 43 prohibits the high-speed mode and moves the vehicle V in the low-speed mode (ST14). Accordingly, when hoping to stop the vehicle V at or near the stop position, the user can stop the vehicle V at a more accurate position. In particular, in a case where the vehicle V is an electric vehicle which can be charged by using contactless charging and the stop position of the vehicle V is a parking space equipped with a contactless charging pad, the user can easily make a fine adjustment to the position where the vehicle V is stopped by moving the vehicle V in the low-speed mode.

Further, in a case where the number of times of the remote autonomous moving process by the authenticated operation terminal 3 is equal to or less than the prescribed number of times (ST11: Yes), the action plan unit 43 prohibits the high-speed mode in ST12 without advancing the process to ST22 to ST29, and executes the process in ST13 to ST17. Thus, when a user who is not accustomed to the remote autonomous moving process performs it, the vehicle speed is always set to the first speed (for example, 2 km/h). Accordingly, it is possible to suppress contact between vehicles and an operation mistake during the remote autonomous moving process.

In this way, the action plan unit 43 of the control device 15 selects one of the plurality of modes (ST27, ST28) based on the speed of the reciprocating operation (ST26), thereby changing the vehicle speed in the remote autonomous moving process based on the speed of the reciprocating operation. Accordingly, the user is required to continue the reciprocating operation on the operation terminal 3 in order to continue moving the vehicle V by the remote autonomous moving process, while the user can stop the vehicle V (ST18, ST30) by stopping the reciprocating operation (ST15: Yes, ST25: Yes). Further, the user can change the mode of the remote autonomous moving process (ST26 to ST28) by changing the speed of the reciprocating operation, thereby changing the vehicle speed to a value set for the corresponding mode.

Concrete embodiments of the present invention have been described in the foregoing, but the present invention should not be limited by the foregoing embodiments and various modifications and alterations are possible within the scope of the present invention. For example, in the above embodiment, the action plan unit 43 of the control device 15 selects one of the plurality of modes based on the operation speed signal sent from the operation terminal 3. On the other hand, the operation terminal 3 may select the mode based on the speed of the repetitive operation (reciprocating operation), and may transmit an operation signal, which includes an input of the repetitive operation (reciprocating operation) and the selected mode, to the action plan unit 43. Further, in the above embodiment, the action plan unit 43 of the control device 15 authenticates the operation terminal 3, and counts the number of times of the remote autonomous moving process based on the input from the authenticated operation terminal 3. On the other hand, the action plan unit 43 may authenticate the operation terminal 3 and the operator who operates the operation terminal 3, and count the number of times of the remote autonomous moving process based on the input from the authenticated operator and the authenticated operation terminal 3. In addition, a specific configuration and position of each member and each portion thereof, quantity, a procedure, and the like shown in the above embodiments can be changed as appropriate within the scope of the present invention. Further, not all of the structural elements shown in the above embodiments are necessarily indispensable and they may be selectively adopted as appropriate.

The invention claimed is:

1. A vehicle control system, comprising:
a terminal configured to be carried by a user; and
a control device configured to execute a remote autonomous moving process to move a vehicle from an initial position to a prescribed stop position based on an input from the terminal and to stop the vehicle at the stop position,
wherein the remote autonomous moving process proceeds on condition of continuation of a reciprocating operation on the terminal by the user, and has a plurality of modes in which a vehicle speed to move the vehicle is set to values different from each other, and
the control device or the terminal is configured to select one of the plurality of modes based on a speed of the reciprocating operation,
wherein the remote autonomous moving process has a low-speed mode in which the vehicle speed is set to a first speed and a high-speed mode in which the vehicle speed is set to a second speed that is higher than the first speed, and
the control device or the terminal is configured to select the low-speed mode when the speed of the reciprocating operation is less than a prescribed threshold and to select the high-speed mode when the speed of the reciprocating operation is equal to or more than the threshold,
wherein the control device is configured to authenticate the terminal, to count a number of times the remote autonomous moving process is executed based on the input from the authenticated terminal, and to prohibit the high-speed mode when the number of times is equal to or less than a prescribed number of times.

2. The vehicle control system according to claim 1, wherein the terminal includes: a touch panel configured to set at least one acceptance area to accept the reciprocating operation by an operation part that can be moved by the user; and a processing unit configured to execute a displaying process of the touch panel and an accepting process of the reciprocating operation on the acceptance area and to cause the touch panel to display the selected one of the plurality of modes.

3. The vehicle control system according to claim 2, wherein the at least one acceptance area comprises a plurality of acceptance areas, and the processing unit is configured to respectively set the acceptance areas in left and right areas of the touch panel and to execute the accepting process based on an input to one of the acceptance areas by the operation part.

4. The vehicle control system according to claim 2, wherein the speed of the reciprocating operation is a reciprocating speed of a reciprocating slide operation in a prescribed direction on the acceptance area by the operation part.

5. The vehicle control system according to claim 2, wherein the terminal is configured to cause the touch panel to display an input screen on which the user inputs the stop position and configured to send information about the inputted stop position to the control device.

6. The vehicle control system according to claim 1, wherein the control device is configured to prohibit the high-speed mode when a distance from the vehicle to the stop position becomes equal to or less than a prescribed distance.

\* \* \* \* \*